(No Model.) 7 Sheets—Sheet 1.

G. B. SHERMAN & J. NUTT.
MACHINE FOR BENDING HAT WIRES.

No. 299,278. Patented May 27, 1884.

Witnesses.

Geo. B. Sherman,
and Jos. Nutt.
By Atty
Inventors.

(No Model.) 7 Sheets—Sheet 2.
G. B. SHERMAN & J. NUTT.
MACHINE FOR BENDING HAT WIRES.
No. 299,278. Patented May 27, 1884.
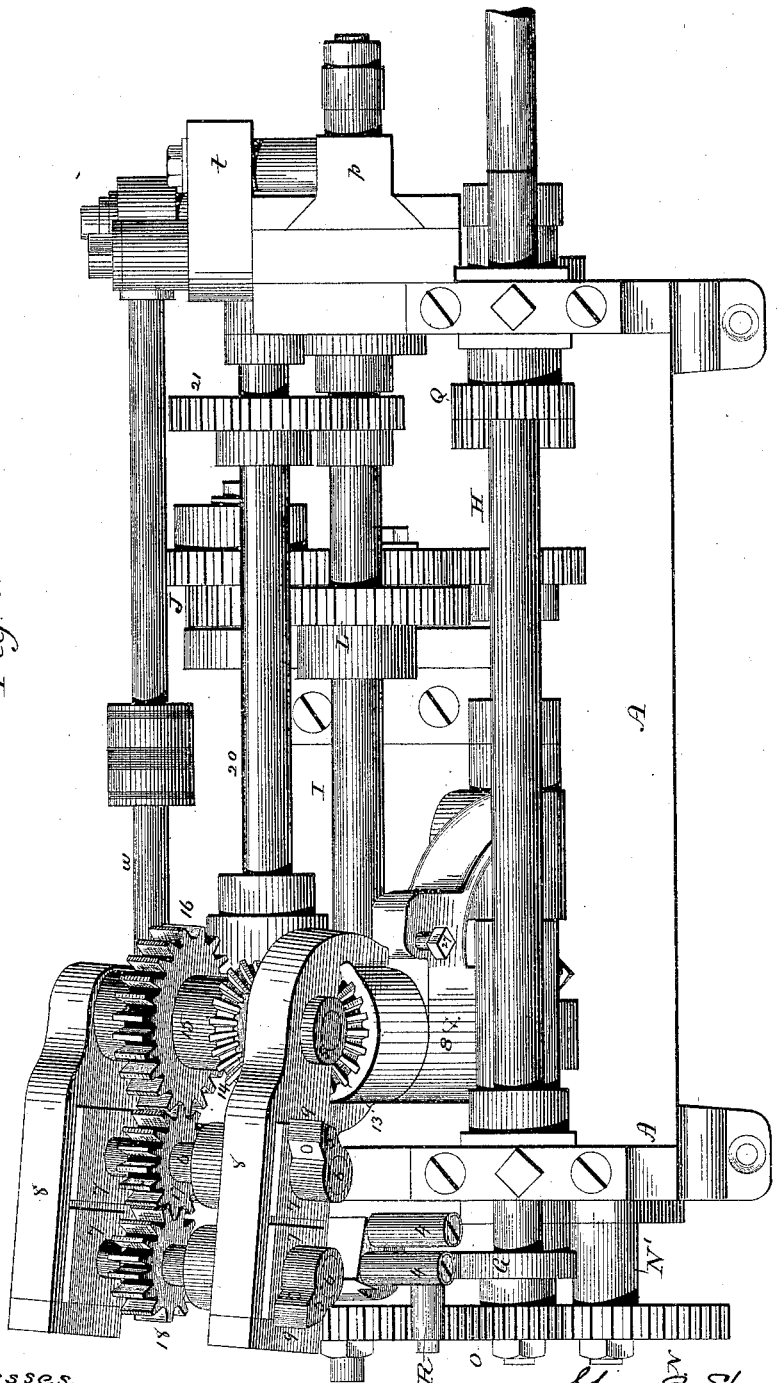

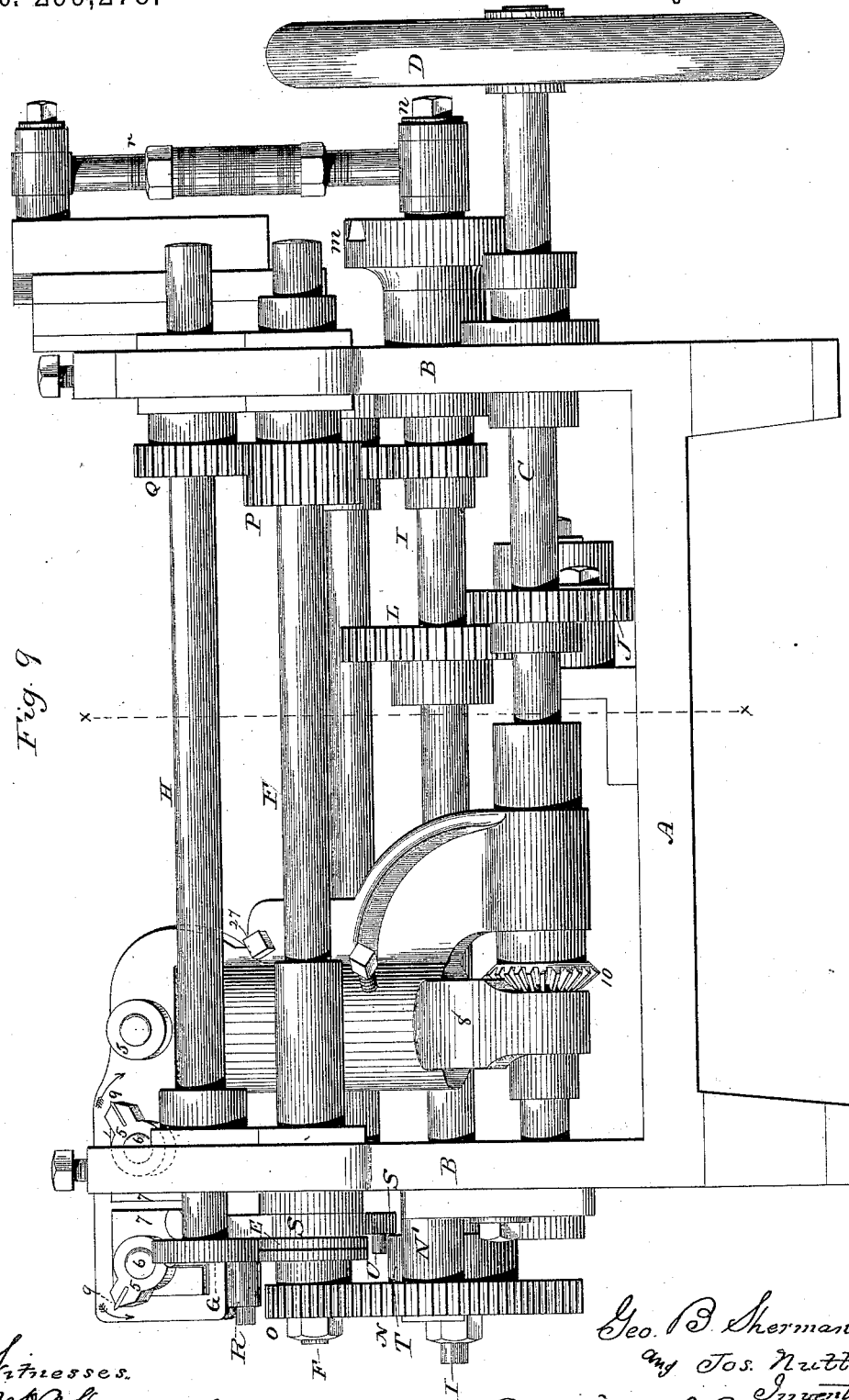

(No Model.)  7 Sheets—Sheet 4.
G. B. SHERMAN & J. NUTT.
MACHINE FOR BENDING HAT WIRES.
No. 299,278. Patented May 27, 1884.
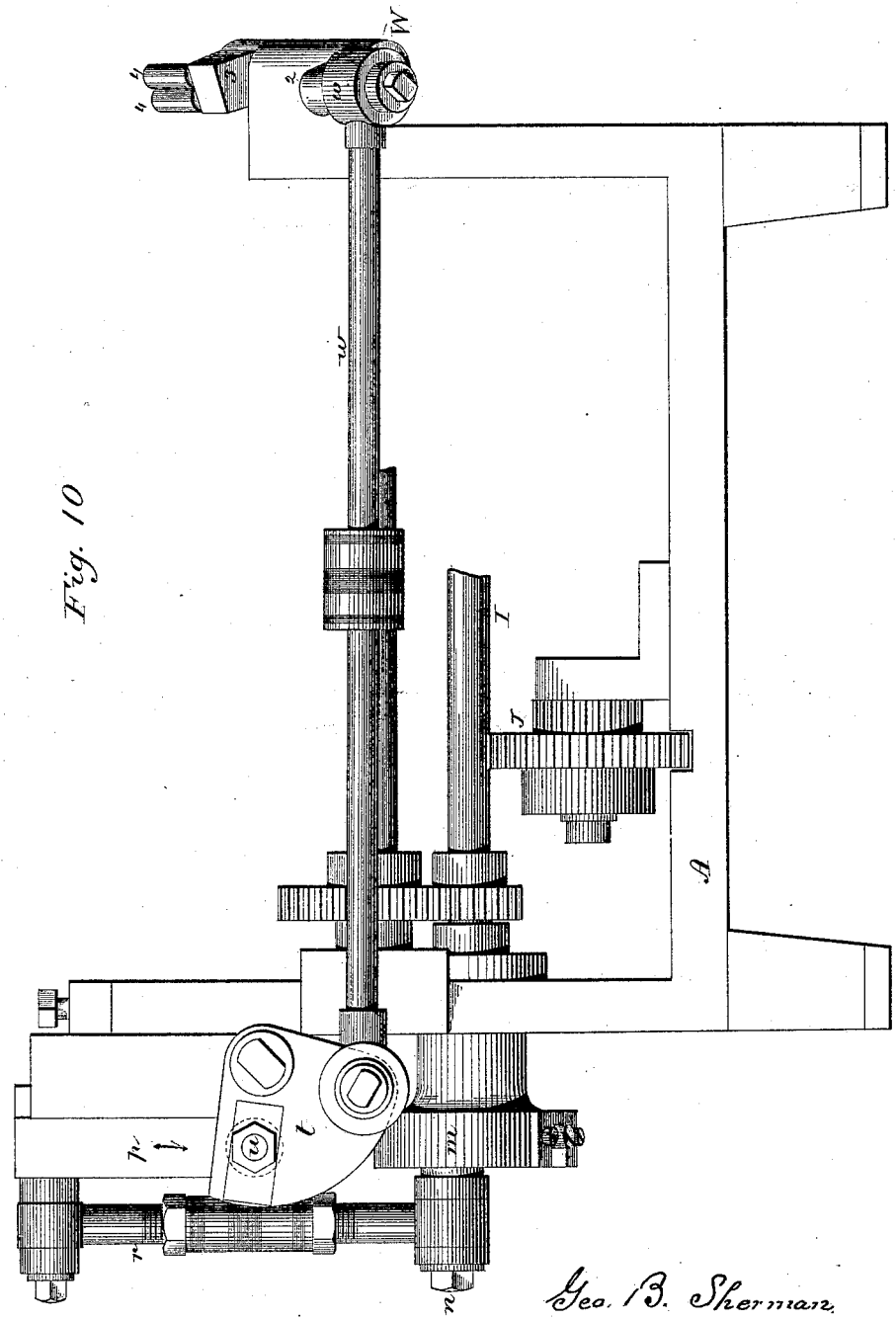

(No Model.) 7 Sheets—Sheet 5.

G. B. SHERMAN & J. NUTT.
MACHINE FOR BENDING HAT WIRES.

No. 299,278. Patented May 27, 1884.

Witnesses:
Geo. B. Sherman
Jos. Nutt
Inventors
By atty.

(No Model.)　　　　　G. B. SHERMAN & J. NUTT.　　　　7 Sheets—Sheet 6.
MACHINE FOR BENDING HAT WIRES.
No. 299,278.　　　　　　　　　　　　　Patented May 27, 1884.
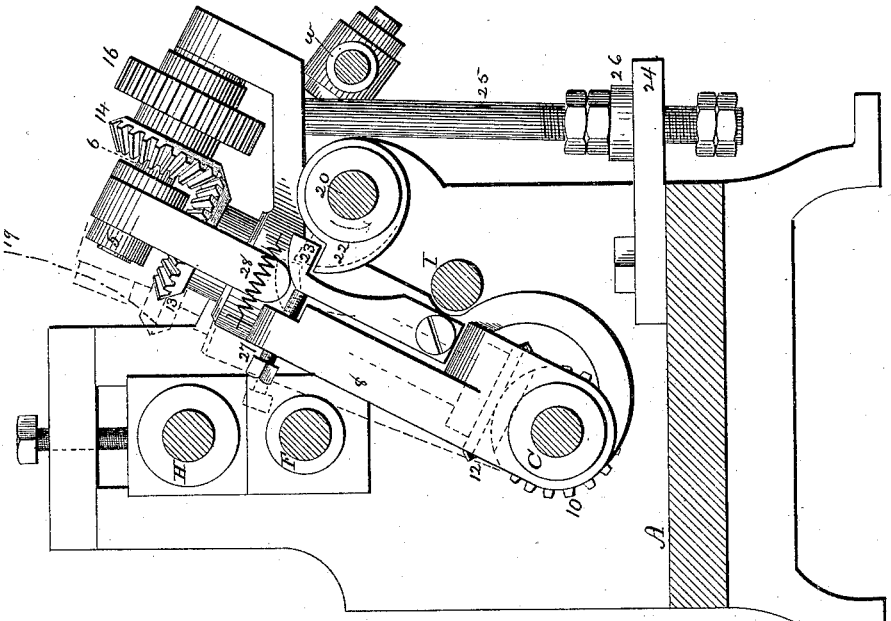
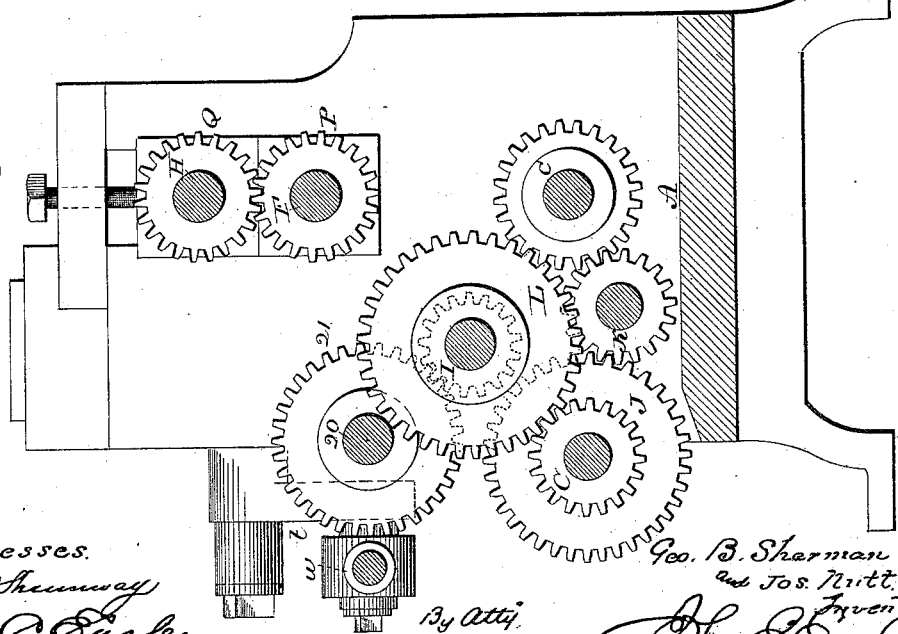
Witnesses.　　　　　　　　　　　　　　Geo. B. Sherman
　　　　　　　　　　　　　　　　　　　and Jos. Nutt.
　　　　　　　　　　By Atty　　　　　Inventors.

(No Model.) 7 Sheets—Sheet 7.
G. B. SHERMAN & J. NUTT.
MACHINE FOR BENDING HAT WIRES.
No. 299,278. Patented May 27, 1884.
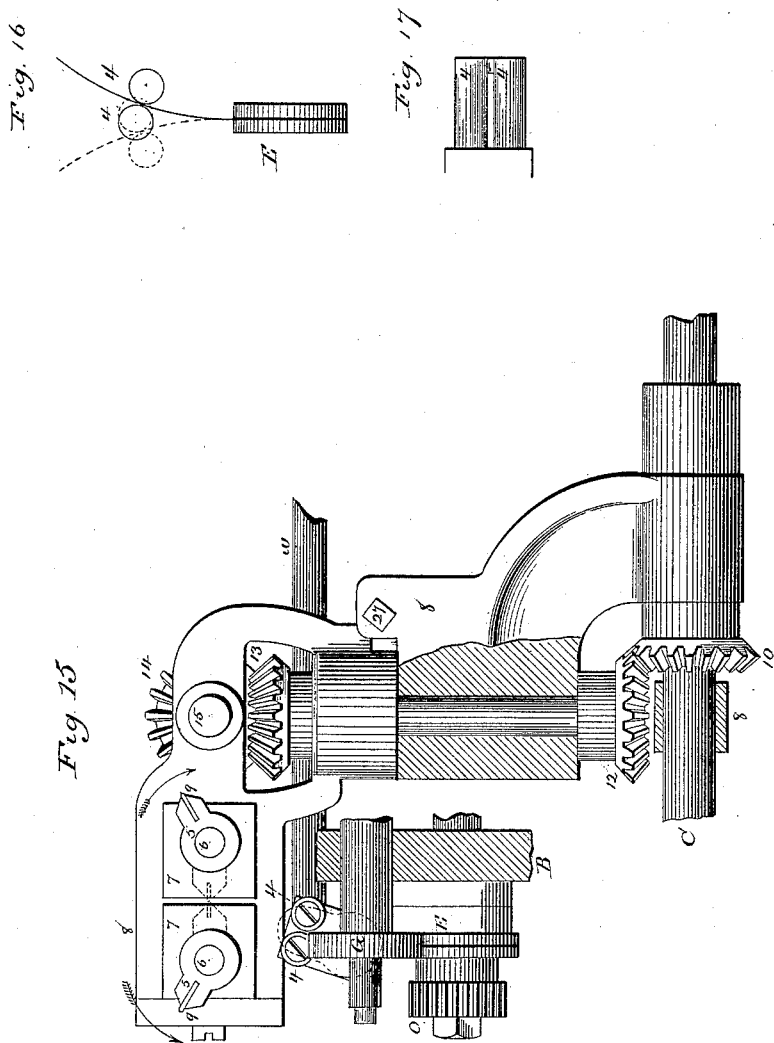

UNITED STATES PATENT OFFICE.

GEORGE B. SHERMAN AND JOSEPH NUTT, OF DANBURY, CONNECTICUT; SAID NUTT ASSIGNOR TO SAID SHERMAN.

MACHINE FOR BENDING HAT-WIRES.

SPECIFICATION forming part of Letters Patent No. 299,278, dated May 27, 1884,

Application filed February 2, 1884. (No model.)

*To all whom it may concern:*

Be it known that we, GEORGE B. SHERMAN and JOSEPH NUTT, of Danbury, in the county of Fairfield and State of Connecticut, have invented a new Improvement in Machines for Bending Hat-Wires; and we do hereby declare the following, when taken in connection with accompanying drawings and the letters of reference marked thereon, to be a full, clear, and exact description of the same, and which said drawings constitute part of this specification, and represent, in—

Figure 1:
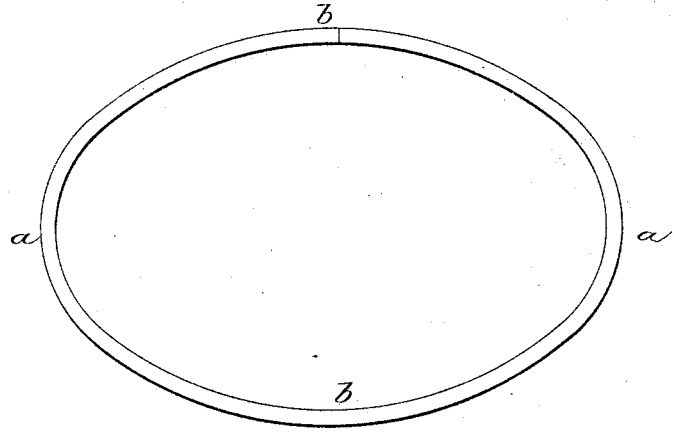
Figure 2:
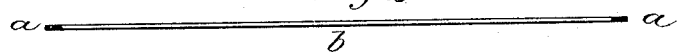
Figure 3:
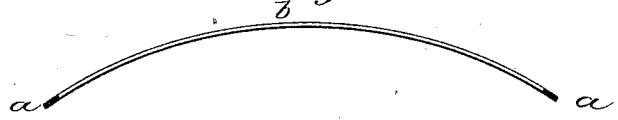
Figure 4:
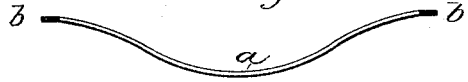
Figure 5:
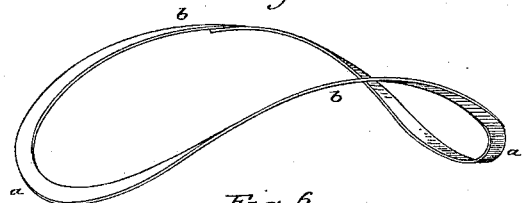
Figure 6:
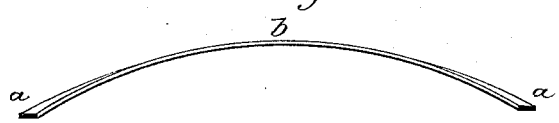
Figure 7:
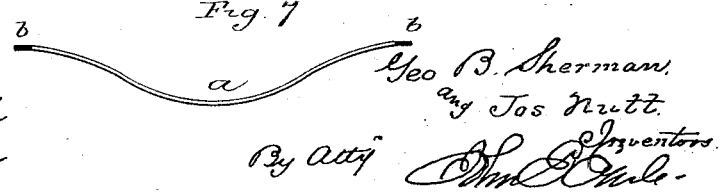
Figure 12:
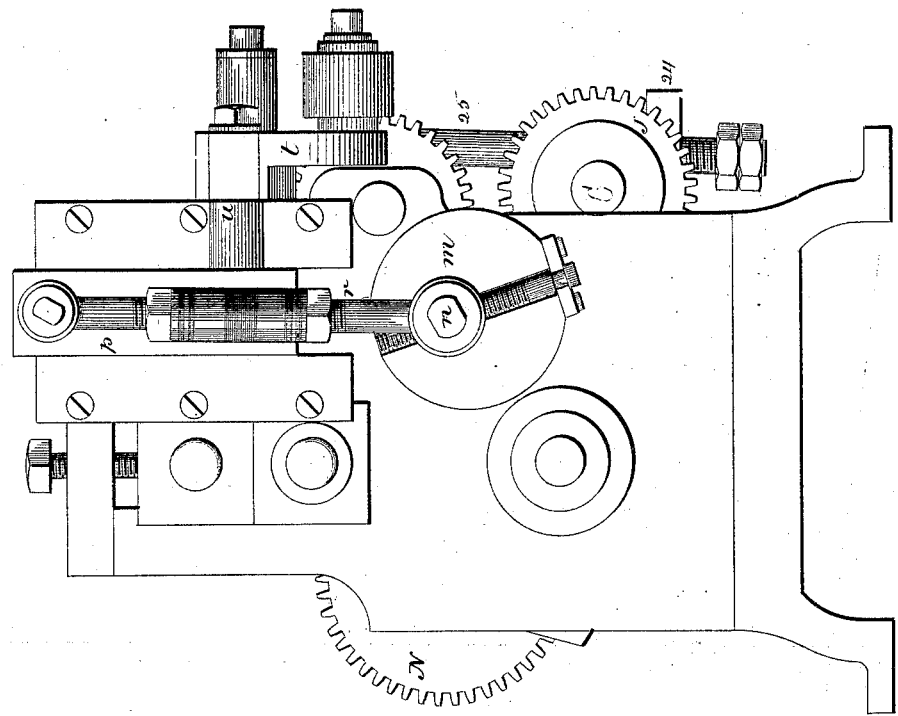
Figure 11:
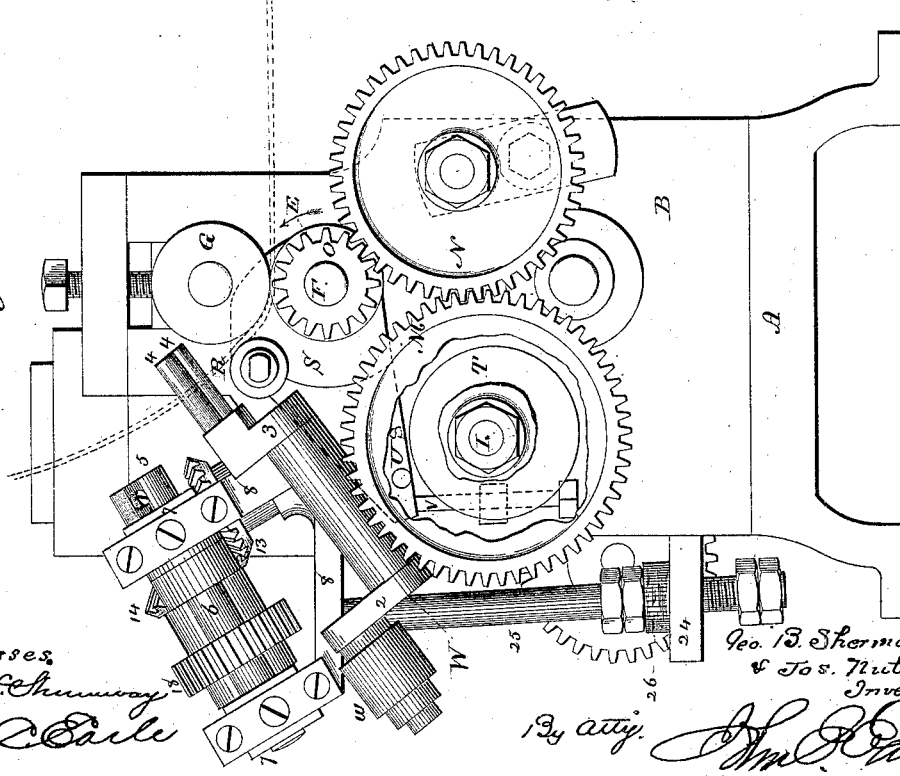

Figure 1, a plain flat elliptical wire frame; Fig. 2, a section cutting through on the longest diameter; Fig. 3, the same as Fig. 2, but bent from the horizontal plane to give the dip at the front and rear; Fig. 4, a transverse section cutting at right angles to Fig. 3, and showing the dip; Fig. 5, a perspective view of our improved frame; Fig. 6, a section of the same cutting through the longest diameter—that is, centrally from front to rear; Fig. 7, a transverse section on the shortest diameter—that is, cutting through the center from side to side; Fig. 8, a top or plan view of the machine; Fig. 9, a front side view; Fig. 10, a rear view, portions omitted; Fig. 11, a left-hand end view; Fig. 12, a right-hand end view; Fig. 13, a vertical transverse section cutting through line $x\ x$ of Fig. 9, and looking to the right; Fig. 14, a vertical transverse section on same line, looking to the left; Fig. 15, a sectional front view of the frame carrying the revolving cutters, also showing a front view of the bending-rolls G E, and of the rolls or fingers 4 4; Fig. 16, a detached view to illustrate the operation of the rocking rolls or fingers; Fig. 17, a modification of the fingers.

This invention relates to an improvement in machines for automatically shaping the wire springs or frames which are introduced into the brims of hats to give them the required curvature. These frames must have an outline corresponding to the periphery of the rim. In some cases this is a complete circle, in others elliptical—that is, narrower from side to side than from front to rear; and as it is necessary that the brim shall droop or dip at the front and rear, a corresponding curve from the flat plane must be given to the spring or frame, in order that the frame may aid in retaining the shape of the brim. These frames are usually made from tempered steel wire, and require treatment to give them the requisite compound curved shape. As the greatest force which the spring is required to resist is radial—that is, against the edge of the brim, the stronger the frame can be made in that direction the better. In the more general construction of this class of frames the wire has been bent into the hoop shape flatwise—that is, so as to bring the flat or broad surface of the wire outward, the edges up and down, thus presenting the wire in its weakest form to the edge of the brim. If the wire be simply bent edgewise into a hoop shape, as seen in Fig. 1, and so that the wire lies in a horizontal plane, as seen in Fig. 2, the hoop has the outline of the brim in a horizontal plane, but without the dip. Now, if this flat hoop be bent to give the required dip, as seen in Fig. 3, the wire will lie in a flat plane at the sides, as seen in Fig. 4, but from the center sides will gradually incline downward, as seen at the extreme ends, Fig. 3, and because of the twist which such a bend gives to the wire it loses a large portion of its strength radially—that is, to resist the force from the outside.

The object of our invention is to produce a machine which will automatically bend the wire into the hoop shape, and at the same time give to it a curvature to produce the dip at the front and rear and without twisting; and the invention consists in the combination of mechanism whereby the wire is received and the compound bend given to it as it passes through the machine, delivering a completely bent but untwisted wire frame from the machine, as more fully hereinafter described.

The frame which we propose to produce is seen in perspective, Fig. 5. It is made from flat wire bent edgewise into hoop shape, elliptical or round, as the case may be, and curved to give the drop, but so as to retain the wire flat in a horizontal plane at all points around the frame, $a\ a$, Fig. 6, representing the extreme center at the front and rear, and $b\ b$ representing the center at opposite sides. The frame is made with downward curves from the center of its sides toward the front and rear, and every portion of these two downward curves is horizontal from its inside to its outside, as seen in Figs. 6 and 7; hence the frame presents its edge directly outward in its strongest shape. This peculiar construction of frame constitutes the subject of an independent application for Letters Patent.

We will now proceed to describe the invention as illustrated in the accompanying drawings.

A is the bed of the machine, upon which stand uprights B B, these uprights supporting the various shafts. C is the principal or driving shaft, to which power is applied. It may be by hand through a crank-wheel, D, or through a pulley driven by means of a belt, in the usual manner of communicating power to machines.

E is the principal or first roll, arranged upon the shaft F and outside the upright at one end of the machine; G, the second roll, arranged upon the shaft H, these shafts being parallel with each other. One of the rolls—preferably E—has an annular groove in its periphery corresponding in width to the thickness of the wire and less in depth than the width of the wire. Both rolls may be correspondingly grooved; but one is sufficient.

I is an intermediate shaft, to which rotation is communicated from the driving-shaft C, by a gear, J, on said shaft C, through a pinion, K, working into a gear, L, on the shaft I. This shaft I extends through the upright at the roll end of the machine, and is there fitted with a gear, M, working into a gear, N, which in its turn works into a pinion, O, on the shaft F, which carries the roll E, and so as to turn the roll in the direction indicated by the arrow, Fig. 11. A like rotation is communicated to the shaft of the second roll, G, by a gear, P, on the shaft F, working into a corresponding gear, Q, on the shaft H.

R is the third roll, which is hung upon a lever, S, the said lever hung loosely upon the shaft F. The roll R is in such position with relation to the rolls E and G that the wire introduced between the rolls E and G turns upward to pass the roll R, as indicated by broken line d, Fig. 11, the said line indicating the wire. By this relative position of the roll R the curve is given to the wire to produce the hoop shape. If that roll be stationary, then the hoop shape will be a circle. That circle may be increased or diminished by setting the roll R at a greater or less distance from the roll G—an adjustment common in bending apparatus; but to produce an elliptical shape the roll R must change its relative position to the roll G during the process of bending the hoop or frame. To give this requisite movement to the roll R, an eccentric, T, is arranged on the shaft I. The speed of the machine is such that the shaft I makes two full rotations for each frame. The gears M N O are therefore adjusted so that the feed-rolls will take in the requisite length of wire for a single frame during the two revolutions of the shaft I. To permit such adjustment of the gears, the gear N is hung upon an adjustable stud, N', as seen in Figs. 8, 9, and 11. This adjustment of gearing is too well known in other machines to require particular description in this specification.

From the lever S a stud, U, projects over the eccentric T, and so as to bear upon the eccentric throughout its whole or partial rotation. If the lever ride upon the eccentric throughout its entire revolution, then the roll R will receive its extreme advance and receding movement toward and from the roll G, and consequently will produce the greatest extent of ellipse—that is to say, starting from the end of the wire which is to be at the center of one side of the frame, the roll R will gradually advance toward the roll G until the extreme throw of the eccentric is attained, which will be at the center front, or one-fourth the circumference of the frame. Then from that point the roll R will recede until the opposite point of the eccentric is reached, which will be the side center of the frame. Then the roll R will again gradually advance toward the roll G, as before, until the center rear of the frame is reached, and then recede until the opposite end is reached. Thus the radius of the curves will decrease from the point of starting to the center front, thence increase to the center side, again decrease to the center rear, and then increase to the end, thus producing an elliptical shape, and this elliptical shape may be varied by applying eccentrics of greater or less eccentricity in place of the eccentric T; or, which answers the same purpose, the lever S may be adjustable vertically, so as to take it out of reach of the eccentric during a part of its revolution, but come within it during the remainder. The operation of the eccentric while bearing upon the roll will occur on the shorter bends—that is, at the front and rear of the frame—and this adjustment is made by means of a set-screw, V, on the side of the upright, so that the lever S will strike the screw, as seen in Fig. 11, before the shorter diameter of the eccentric is reached, and from that point the eccentric will continue its revolution without action upon the lever; but so soon as the periphery of the eccentric comes in contact with the stud U, then the lever will rise, as before, to the extreme throw of the eccentric and return until it reaches the stop V. It will be apparent that while the frame thus bent would have attained the required shape for the circumference of the brim, it would be in the same plane throughout, as in Fig. 2. To give the required droop or dip to the front and rear, the wire must be bent at right angles to the plane of the rolls G E R. To give this bend, a rock-shaft, W, is arranged on the upright at right angles to the axis of the roller-shafts, but inclined thereto, as seen in Fig. 11.

A rocking motion is imparted to this shaft by means of a crank-wheel, m, on the shaft I, carrying a crank-pin, n. Above the crank-wheel m is a vertical slide, p, in connection with the crank-pin by an adjustable pitman, r, (see Figs. 10 and 12,) and so that in the rotation of the crank-wheel m a vertical reciprocating movement is imparted to the slide p. On the rear of the machine, and parallel with the several shafts, is an elbow, t, one arm of which is in connection with the slide p by means of a stud, u. From the other arm a connecting-rod, w, extends to an arm, 2, on the rock-shaft W. As the slide p reciprocates vertically, it imparts rocking movement to the elbow t, and that, through the connecting-rod w, imparts a corresponding rocking movement to the rock-shaft W.

At the forward end of the rock-shaft W is a right-angular arm, 3, carrying a pair of fingers, 4 4, their axes parallel with the axis of the rock-shaft W, and so that as the wire passes upward from between the rolls G R it will run between the fingers 4 4, as seen in Fig. 11. The rocking movement of these fingers 4 4, imparted as before described, is to the right and left of the central plane of the rolls G E R—that is, to the right and left of the line on which the wire passes between the rolls G E R. Now, it will be evident that, if the fingers 4 4 remained stationary in such central plane, they would have no effect upon the wire passing between them; but if they stand at one side of that plane and the wire be led between them, then it follows that the wire will be turned from the plane in which it passes from the rolls, and thus give a bend to the wire in that direction, that bend being at right angles to the bend which is given by the rolls G E R. As before stated, the shaft I makes two revolutions during the bending of each frame; consequently two full rocking movements are imparted to the fingers 4 4 during such bending of the frame—that is to say, from the position at the right in Fig. 16 to the position at the left in same figure and return to the right, then again to the left, and a second return to the right. Supposing, then, the bending to commence with the position seen at the right in Fig. 16, and that, as before stated, the two ends of the frame are to be joined at the center of one side, the end of the wire is passed through the rolls, so as to be presented to the fingers 4 4 in the position seen at the right in Fig. 16. This done, the work continues, and as the wire is drawn through by the rolls G E R and passes to the pair of fingers 4 4 these fingers 4 4 gradually rock to the extreme left, as seen in Fig. 16, and arrive at that point at the time the center front of the frame has been reached, and this passage of the fingers 4 4 from right to left gives the downward curve from the center of one side to the center front, then returning gives the upward curve from that center front to the opposite center side, then again to the left gives the downward curve from that last center side to the center rear, and again returning, the upward bend from the center rear to the place of beginning, and the bending of the hoop is complete; and at that point the wire is cut off, leaving only sufficient extra length for the union of the two ends, if it be necessary. As the axes of the fingers 4 4 are at right angles to the axis of the rolls G E R, and operate upon the flat sides of the wire, it follows that as the rolls G E R bend the wire into the hoop shape, the wire, as it passes between the fingers 4 4, is held in a plane at right angles to the plane of the bend given by the rolls G E R, and this right-angular plane will be maintained throughout the entire length of the wire. Consequently, when the ends of the wire are united, as seen in Fig. 5, the wire will lie in a flat or horizontal plane throughout the entire hoop—that is, at diametrically-opposite points in the frame, no matter where taken. The wire at those two diametrically-opposite points will be in the same horizontal plane. The length of the fingers 4 4 is sufficient to permit the wire to freely move in a longitudinal plane between the fingers, which it will do, owing to the elliptical shape or constantly varying radius of the curve being bent by the rolls G E R. The extent of the rocking movement of the fingers 4 4 must be varied to change the extent of dip to the frame—that is, if a greater dip is desired, then the extent of rocking movement must be greater, and vice versa. This extent of rocking movement is adjusted by moving the crank-pin n to a greater or less distance from its center of motion by means of the leading-screw, as seen in Fig. 12. We have said that after the compound bend thus produced the wire is cut off, and have made that statement on the supposition that the wire is fed in from a reel; but the wires may be cut to a length before they are introduced to the machine, so that no cutting apparatus will be necessary. The groove in one or both of the rolls, which corresponds to the thickness of the wire, serves to locate and hold the wire in the same plane with relation to the rolls G E R throughout.

As it is desirable to make the machine automatic, so as to take the wire directly from the reel and cut off each successive frame as it is completed, we have devised a cutting apparatus which will act upon the wire while running, and without stopping the feeding or drawing in of the wire.

The cutting device consists in a pair of cutter-heads, 5 5, arranged upon their respective shafts 6 6. These shafts are parallel with each other, and are arranged in bearings 7 7 in a swinging frame, 8, hung upon the driving-shaft C, and so as to swing thereon, as from the position seen in Fig. 14 to the position indicated in broken lines, same figure. The shafts thus carrying the cutter-heads are at substantially right angles to the axis of the rolls G E R. The cutter-heads each carry a cutter, 9. To the shafts which carry the cutter-heads a rotation is imparted from the driving-shaft by means of a bevel-gear, 10, working into a corresponding bevel-gear, 12, on a vertical shaft in the swinging frame 8, which carries at its upper end a bevel-gear, 13, working into a bevel-gear, 14, on a counter-shaft, 15, and on which counter-shaft is a gear, 16, working into a pinion, 17, on one of the cutter-shafts, and that pinion into a corresponding pinion, 18, on the other shaft, and whereby the cutters are caused to constantly revolve in the direction indicated by arrows, Figs. 9 and 15. The speed of rotation imparted to the cutters gives to them a velocity corresponding to that of the wire passing through the bending-rolls. In their normal condition the rolls stand back out of the path of the wire, as seen in Fig. 14, the broken line 19 indicating the wire as it is running through the bending-rolls.

In rear of the frame 8 is a shaft, 20, to which rotation is imparted by a pinion on the shaft I, working into a corresponding gear, 21, on said shaft 20. On the shaft 20 is a cam, 22, which works against an adjustable bearing, 23, on the frame 8. This cam is concentric with the shaft throughout a larger portion of its circumference, and so that as the shaft and cam revolve it has no effect upon the frame until the rise of the cam commences. Then the rise of the cam, operating against the bearing 23, forces the frame 8 forward, as indicated in broken lines, Fig. 14, which movement brings the revolving cutters into the path of the wire coming through the rolls, and just as the frame reaches its extreme forward movement the cutters come together, as indicated in broken lines, Fig. 16, catching the wire between them, and, continuing their revolution, cut the bent frame, so as to separate it from the body of the wire, and it is delivered from the machine. So soon as this cutting is completed the cam escapes from its bearing 23, and so as to permit the frame to fall back out of the path of the wire, as seen in Fig. 14, and there it will stand, the cutters still revolving until the next frame is bent, when in like manner they will advance and cut the second frame, and so on. By giving to the cutters a rotation in the direction in which the wire is moving and a velocity corresponding to the movement of the wire, the cut is produced without in any way interrupting or interfering with the movement of the wire; hence it is not necessary to stop the feed or run of the wire to produce the cut, as is generally necessary in machines where wire is fed and cut off at given lengths.

The frame 8 is supported, when at rest, upon a stop, 24. This stop is produced by a rod, 25, extending downward from the frame and through the stop, and on the rod is a nut, 26, which bears upon the stop 24 when the frame is at rest, and so that the frame will not ride upon the cam.

The advance of the cutters toward the wire is adjusted by means of the bearing 23 through an adjusting-screw, 27. This screw, being turned inward, carries the bearing toward the cam, and so that the advance of the cutter will be proportionately increased; or if the screw be withdrawn, so as to permit the bearing to recede from the cam, then the advance of the cutters will be correspondingly decreased. This adjustment of the machine is necessary in order to adapt it to frames of various diameters. In a very large hoop the frame will be permitted to recede to a greater distance by raising the nut 26, then adjusting the bearing 23 accordingly, or vice versa. The spring 28 serves to hold the bearing 23 against the adjusting-screw 27, but yields as the bearing is forced toward the cam.

The employment of continuously-revolving cutters in combination with continuously-revolving feed-rolls, the axis of the cutters at substantially right angles to the axis of the feed-rolls, the revolution of the cutters corresponding to the advance of the wire by the feed-rolls, is applicable to various machines into which wire is fed to be cut off at given lengths, and by which a constant run or feed of wire may be maintained. The movable frame in which the continuously-revolving cutters are arranged, and by means of which they may be presented into the path of the wire at predetermined times, and then taken therefrom, whereby the wire may be cut at predetermined times—that is to say, in lengths greater than would be permitted if the cutters were to stand in the path of the wire, so that each revolution of the cutters would cut the wire—is also applicable to other purposes. We therefore do not wish to limit this part of our invention to the particular machine which we have herein described.

The various parts of the machine are made adjustable by well-known mechanism, as shown in the drawings, not necessary to be particularly described in this specification.

While we prefer the mechanism which we have shown and described at various points for converting rotary into reciprocating or rocking movements, other known mechanical equivalents may be substituted therefor.

In some classes of work it is preferred that the flat wire frame shall stand vertically—that is, that it shall present a broad flat surface outward instead of the thin edge, as hereinbefore described. This machine will produce a spring of this character, it only being necessary to construct the groove in the bending-rolls accordingly, so that the wire will be properly held and guided through those rolls, they operating upon the two flat sides of the wire instead of the edges, as before described, and the rocking fingers 4 4 are adjusted to operate upon the edges of the wire, instead of upon the flat surface, as before described. In some classes of work round-wire frames are desirable in preference to either of the said flat frames. This machine operates the same upon the round wire as upon flat, the groove in the rolls being made to correspond to the shape of the wire. We have represented both the rolls G E as driven, and prefer this construction, yet the one roll, E, may be alone driven, the second roll, G, receiving its rotation from the roll E through the wire passing between the two rolls.

We have represented the rocking fingers which give the dip or droop to the frame as rolls, and prefer that they should operate as rolls, as they offer less friction to the passing wire than non-revolving fingers would do, yet they may be stationary studs, say of the same shape as represented, or they may be a pair of fingers connected at their outer end, as seen in Fig. 17, it only being essential to this part of our invention that the rocking movement shall be across the plane of the rolls G E. We wish, therefore, by the term "fingers," to be understood as including any substantial equivalent therefor which shall be arranged to receive the wire after it passes from the bending-rolls, and which shall have a movement back and forth across the plane of the said bending-rollers.

It will be evident to those skilled in the art that in place of the eccentric T, which imparts automatic movement to the third bending-roll R, a cam may be employed presenting an irregular working-surface; but as such a cam is a well-known substitute for an eccentric, and as the eccentric is in this case in fact a cam, it is not necessary to illustrate the various shapes of cams which may be employed in order to give the requisite movement to the roll R to advance and retreat at the proper times.

We claim—

1. The combination of the rolls G E R, the fingers 4 4, arranged with their axes in a plane at right angles to the axes of the rolls G E R, and mechanism, substantially such as described, for imparting rotation to said rolls G E and a rocking movement to said fingers 4 4, said rocking movement being across the plane of said rolls G E R, substantially as specified.

2. The combination of the rolls G E and mechanism, substantially such as described, for imparting rotation to said rolls G E, the roll R, arranged upon an axis parallel with the rolls G E, and mechanism, substantially such as described, to automatically impart a movement to said roll R toward and from the rolls G E, the rocking fingers 4 4 and mechanism, substantially such as described, for imparting rocking movement to said rolls across the plane of the rolls G E R, substantially as specified.

3. The combination of the rolls G E, mechanism, substantially such as described, for imparting rotation thereto, the lever S, hung loose upon the axis of the roll E, the roll R, hung upon said lever S, with its axis parallel with the axis of the rolls G E, an eccentric, T, arranged to act upon said lever S, and the adjustable stop V, substantially as described.

4. The combination of the rolls G E R, mechanism, substantially such as described, for imparting rotation thereto, the lever S, hung loose upon the axis of the roll E, the roll R, hung upon said lever S, with its axis parallel with the axis of the rolls G E, an eccentric, T, arranged to act upon said lever S, and the adjustable stop V, the fingers 4 4, arranged in a plane at right angles to the axis of the rolls G E, and mechanism, substantially such as described, to impart a rocking movement to said fingers 4 4 across the plane of the rolls G E, substantially as described.

5. The combination of a feeding device for wire, consisting of a pair of continuously-revolving rolls and a pair of revolving cutters, their axis of rotation being substantially at right angles to the axis of the feeding-rolls, the edge of the cutters substantially parallel with their axis of rotation, whereby at a predetermined time said revolving cutters will cut the wire without interrupting the feed of the wire, substantially as described.

6. The combination of a feeding device for wire, consisting of a pair of continuously-revolving rolls and a pair of revolving cutters, their axis of rotation being substantially at right angles to the axis of the feeding-rolls, the edge of the cutters substantially parallel with their axis of rotation, said revolving cutters arranged in a frame movable to present the cutters into the line of the wire at predetermined times, to cut the wire and then take them out of the line of the wire, with mechanism, substantially such as described, to impart the said movement to the said frame, substantially as described.

7. The combination of the rolls G E R, the fingers 4 4, and the continuously-revolving cutters 9 9, the said revolving cutters arranged in a frame movable to present the cutters into the line of the wire at predetermined times to cut the wire, and then take them out of the line of the wire, with mechanism, substantially such as described, to impart the said movement to the said frame, substantially as described.

8. The combination of the rolls G E, mechanism, substantially such as described, for imparting rotation thereto, the frame 8, arranged to swing upon an axis substantially parallel with the axis of said rolls G E, a pair of revolving cutters arranged in said frame, with their axes at substantially right angles to the axis of the said rolls G E, the edge of the cutters substantially parallel with their axis of rotation, mechanism, substantially such as described, to impart constant rotation to said cutters, a revolving cam, 22, arranged to bear upon said frame and impart to it a swinging movement, whereby at predetermined times the said cutters are advanced to their active position and then permitted to retreat, substantially as described.

9. The combination of the rolls G E, mechanism, substantially such as described, for imparting rotation thereto, the frame 8, arranged to swing upon an axis substantially parallel with the said rolls G E, a pair of revolving cutters arranged in said frame, with their axes at substantially right angles to the axis of the said rolls G E, the edge of the cutters substantially parallel with their axis of rotation, mechanism, substantially such as described, to impart constant rotation to said cutters, a revolving cam, 22, adjustable bearing 23 on said frame, and against which said cam operates to impart a swinging movement to said frame, substantially as described.

GEO. B. SHERMAN.
JOSEPH NUTT.

Witnesses:
EVERETT S. JUDD,
DAVID B. BOOTH.